No. 866,245. PATENTED SEPT. 17, 1907.
V. J. WAHLSTROM.
CHUCK.
APPLICATION FILED NOV. 8, 1906.

Attest
F. H. Vick
H. C. Karlson

Inventor
Verner J. Wahlstrom.
By Sydney A. Prescott, Atty.

UNITED STATES PATENT OFFICE.

VERNER J. WAHLSTROM, OF NEW YORK, N. Y.

CHUCK.

No. 866,245.  Specification of Letters Patent.  Patented Sept. 17, 1907.

Application filed November 8, 1906. Serial No. 342,558.

*To all whom it may concern:*

Be it known that I, VERNER J. WAHLSTROM, a citizen of the United States, residing at New York, in the county of Kings and State of New York, have invented a new and useful Chuck, of which the following is a specification.

This invention relates to an improvement in chucks.

Heretofore, chucks have been constructed in which a series of rollers were used, the rollers operating on inclined faces and contacting with the tool shank, so that as the resistance increased during the drilling operation the rollers were caused to roll up the inclined faces and bite the tool shank with increased force. The angle of inclination of the face upon which the roller operates is necessarily limited, to prevent the roller from slipping back, and the range of the chuck, that is, the number of different sized drills which it can accommodate is, therefore, limited, and this is objectionable.

It is one of the objects of this invention to provide a chuck in which a wider range is obtained.

Another object is to provide a chuck having jaws moved radially toward and away from the axis of the chuck, the biting action being effected by rollers operating on inclined faces on the jaws so that only a very limited movement of the roller is necessary to hold the drill shank after it has been brought into contact with the same.

With this and other objects in view, the invention consists in certain constructions and combinations which will be hereinafter fully described and then specifically pointed out in the claims hereunto appended.

Figure 1:
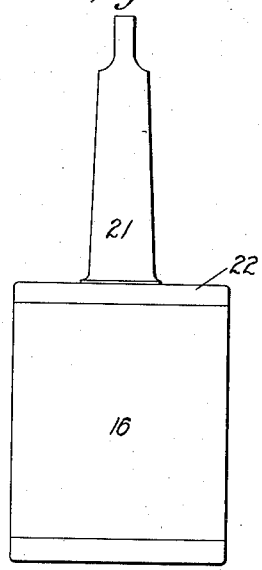
Figure 2:
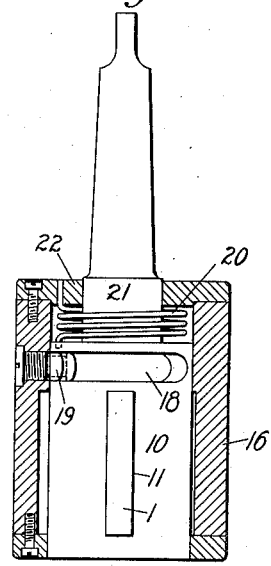
Figure 3:
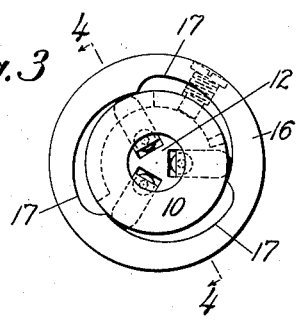
Figure 4:
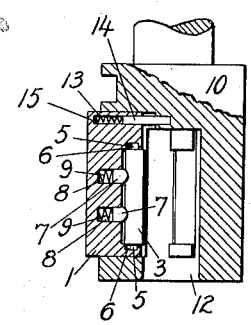
Figure 5:
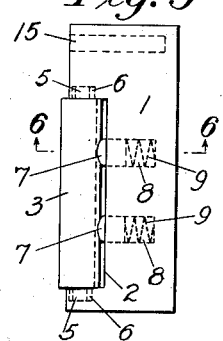
Figure 6:
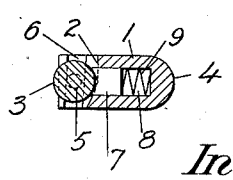

In the drawings which form a part of this specification and in which like characters of reference indicate the same parts, Figure 1 is an elevation of a structure embodying the invention, Fig. 2 is an elevation, partly in section, of the structure shown in Fig. 1, Fig. 3 is an end view with certain parts removed, Fig. 4 is an elevation, partly in section, of the chuck body and one of the radially movable jaws, Fig. 5 is an enlarged detailed view of one of the jaws and Fig. 6 is the section on line 6—6 in Fig. 5.

In carrying the invention into effect, a radially movable jaw having an inclined face is employed and this jaw carries a roller which is arranged to be rolled up the inclined face of the jaw by the resistance of the tool shank to the turning movement of the chuck. While the jaw may vary in form, as shown, a jaw 1 is employed having an inclined face 2 and carrying a roller 3 on its operating edge. In the device illustrated, the jaw is provided with a rounded rear edge 4, the purpose of which will be hereinafter explained. While the roller 3 might be held otherwise in position, as shown, it is provided at either end with a stud 5 which is loosely fitted in the slot 6 cut transversely in the jaw, the slot 6 being wide enough to permit the roller being thrown in and out of contact with the inclined face 2.

Spring actuated means are employed for the purpose of normally keeping the roller out of contact with the inclined face and returning it to its normal position after a drill has been released and this means consists of a pair of plungers 7 mounted to slide in recesses 8 cut in the jaw, the plungers 7 being held against the roller by means of springs 9.

The operation of this part of the structure is as follows: The jaw is moved toward the axis of the chuck by any suitable means and after the roller 3 comes in contact with the shank of the tool a further movement of the jaw results in the springs 9 being compressed and the roller 3 forced against the inclined face 2. The resistance of the tool shank to the rotating movement of the chuck then causes the roller to ride up the inclined face 2 and bite the tool shank harder as the resistance increases. Owing to the fact that the roller is seated against the inclined face before it comes into operation, a very slight rolling movement is all that is necessary to bite the tool shank hard. When the tool is to be released, the jaw is moved in the opposite direction and the plungers 7 return the roller to its normal position which is that shown in Figs. 5 and 6.

In the best constructions and as shown, a plurality of radially movable jaws each having an inclined face and each carrying a roller operating on said face, is employed, and when, as in the present invention, three of such jaws are used, they are spaced 120 degrees apart, as is clearly shown in Fig. 3.

When a plurality of jaws are used they are mounted in a cylindrical chuck body 10 having radial slots 11 cut through its walls and opening into a central aperture 12 within which the tool shank is inserted. The jaws 1 are mounted in the radial slots 11 and are arranged to be moved toward and away from the axis of the aperture 12 with their operative faces in parallelism.

Spring actuated means are employed to move the jaws outwardly or away from the axis of the aperture; and as shown, a spring 13 is employed for this purpose. This spring is wound in an open coil contacting with a post 14 fast in the chuck body and working in a hole 15 in the jaw, the post serving to guide both the jaw and the spring.

Means are provided for positively moving the jaws toward the axis of the chuck for the purpose of bringing the roller 3 into contact with the tool shank and while these means may vary, as shown, a cylindrical sleeve 16 is employed, this sleeve fitting loosely over the chuck body 10 and contacting with the rear edges of the jaws 1. In the best construction and as shown, the sleeve 16 is provided with a series of internal cam faces 17 in direct contact with the rounded rear edges 4 of the jaws 1, although any suitable operating means intermediate the exterior of the sleeve and the jaws, may be employed.

It will be readily understood that if a relative movement in one direction between the chuck body 10 and the sleeve 16 is produced the jaws 1 will be positively moved toward the axis of the aperture 12 against the action of the springs 13, and that if a movement in the opposite direction is produced the springs 13 will force the jaws away from the axis of the aperture maintaining the contact between the internal cam faces 17 and the rear edges of the jaws.

In order to hold the sleeve 16 in its proper position the chuck body 10 is provided with a circumferential slot 18 and the sleeve 16 is provided with a stud 19 which engages the slot 18.

In the device illustrated a rotatory movement is given the sleeve on the chuck body to positively move the jaws toward the axis of the chuck and this is accomplished by means of a spring 20 surrounding the shank 21 of the chuck body 10, one end of the spring being fast in the chuck body 10 and the other end being fast in a plate 22 carried by the sleeve 16.

Changes and variations may be made in the structure by which the invention is carried into effect. The invention, therefore, is not to be limited to the precise details of the structure shown and described.

What is claimed is:

1. In a chuck, the combination with a cylindrical chuck body having a central aperture therein and a plurality of radial slots cut through its walls, of a plurality of jaws mounted in said slots each jaw having an inclined face, a plurality of rollers one of which is carried by each jaw and arranged to be rolled up said inclined face by contact with a tool shank, springs for moving the jaws outwardly, a cylindrical sleeve surrounding the chuck body, operating means intermediate the exterior of the sleeve and the jaws, and means for actuating the sleeve to cause the operating means to positively move the jaws toward the axis of the aperture, substantially as described.

2. In a chuck, the combination with a cylindrical chuck body having a central aperture therein and a plurality of radial slots cut through its walls, of a plurality of jaws mounted in said slots each jaw having an inclined face, a plurality of rollers one of which is carried by each jaw and arranged to be rolled up said inclined face by contact with a tool shank, springs for moving the jaws outwardly, a cylindrical sleeve surrounding the chuck body and provided with internal cam surfaces contacting with the rear edges of the jaws, and means for producing a rotative rotatory movement between the chuck body and the sleeve to positively move the jaws toward the axis of the aperture, substantially as described.

3. In a chuck, the combination with a cylindrical chuck body having a central aperture therein and a plurality of radial slots cut through its walls, of a plurality of jaws mounted in said slots each jaw having an inclined face, a plurality of rollers one of which is carried by each jaw and arranged to be rolled up said inclined face by contact with a tool shank, springs for moving the jaws outwardly, a cylindrical sleeve surrounding the chuck body and provided with a series of internal cam surfaces contacting with the rear edges of the jaws, and a spring for rotating the sleeve to positively move the jaws toward the axis of the aperture, substantially as described.

4. In a chuck, the combination with a cylindrical chuck body having a central aperture therein and a plurality of radial slots cut through its walls, of a plurality of jaws mounted in said slots each jaw having an inclined face, a plurality of rollers one of which is carried by each jaw and arranged to be rolled up said inclined face by contact with a tool shank, springs for moving the jaws outwardly, a cylindrical sleeve surrounding the chuck body and provided with a series of internal cam faces contacting with the rear edges of the jaws, a circumferential slot cut in the chuck body, a stud carried by the sleeve and working in said slot, and a spring for rotating the sleeve to positively move the jaws toward the axis of the aperture, substantially as described.

In testimony whereof, I have signed my name to this specification in the presence of two subscribing witnesses.

VERNER J. WAHLSTROM.

Witnesses:
J. D. H. BERGEN,
SYDNEY I. PRESCOTT.